(12) United States Patent
Wilcox

(10) Patent No.: US 6,944,084 B2
(45) Date of Patent: Sep. 13, 2005

(54) MEMORY SYSTEM THAT MEASURES POWER CONSUMPTION

(75) Inventor: Jeffrey R. Wilcox, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 97 days.

(21) Appl. No.: 10/331,333

(22) Filed: Dec. 31, 2002

(65) Prior Publication Data
US 2004/0128426 A1 Jul. 1, 2004

(51) Int. Cl.⁷ .................................................. G11C 7/00
(52) U.S. Cl. ..................................... 365/226; 365/227
(58) Field of Search ................................ 365/226, 227, 365/228; 361/87; 713/300

(56) References Cited

U.S. PATENT DOCUMENTS 6,385,024 B1 * 5/2002 Olson ............................ 361/87
2004/0003301 A1 * 1/2004 Nguyen ....................... 713/300

* cited by examiner

Primary Examiner—Vu A. Le
(74) Attorney, Agent, or Firm—Kenyon & Kenyon

(57) ABSTRACT

A memory system includes a memory controller and a plurality of memory devices located on a power plane and coupled to the memory controller. The memory system further includes a sense resistor coupled to the power plane and a power source coupled to the sense resistor. The memory system further includes a measurement module that is coupled to the memory controller and that measures a power consumption of the power plane.

27 Claims, 3 Drawing Sheets

MEMORY SYSTEM THAT MEASURES POWER CONSUMPTION

FIELD OF THE INVENTION

The present invention is directed to a computer memory system. More particularly, the present invention is directed to a memory system that measures power consumption.

BACKGROUND INFORMATION

In order to increase the overall speed of computers, both the speed of the computer processor must be increased, as well as the speed of components that interact with the processor, such as memory. As memory speeds increase, the power consumption of the memory increases the amount of heat generated by the memory devices. When the amount of heat surpasses a pre-defined limit, a cooling mechanism must lower the temperature of the memory, or a memory controller must throttle back activity to keep the memory within its thermal limits.

For many computer systems it is not desirable to add devices to support cooling in order to reduce cost and save space. Therefore, most computer systems rely on throttling to keep the memory within their thermal limits. As memory power has increased, the throttling required has also increased, which impacts system performance.

Typically, the level of throttling needed is determined by measuring the different type of memory on the computer system, and then setting the throttling level so that the worst case memory device load is protected, even in the case of a virus-like application which could sustain the worst case power workload for a given device. This method is used since there is no realistic way of knowing how much actual power the type of memory device populated in the system consumes. The result is that a bandwidth throttling setpoint must cater to the worst-case components with no way of taking advantage of memory designs that consume less power.

In addition, memory throttling levels are based on specifications of the memory devices in the computer system and are typically conservative. This causes the memory controller to potentially throttle unnecessarily when lower power memory is used, which negatively impacts the performance of the system.

Further, increased speeds of memory devices typically increase the heat of the memory controller as well since the memory controller has similar thermal constraints as the memory devices. Transactions such as writing to the memory are typically monitored for excessive bandwidth based on power assumptions based on the worst case properties of the memory controller device. Throttling due to these constraints can also negatively impact performance.

Based on the foregoing, there is a need for a computer system having a memory controller that more accurately throttles a memory sub-system by determining a more accurate reading of the power consumption of the components that require activity throttling to ensure that they are functioning within their thermal limits.

DETAILED DESCRIPTION

One embodiment of the present invention is a memory controller that measures the peak power requirements of the memory devices of a computer system. The memory controller then calibrates the throttling levels based on the measurement.

Figure 1:
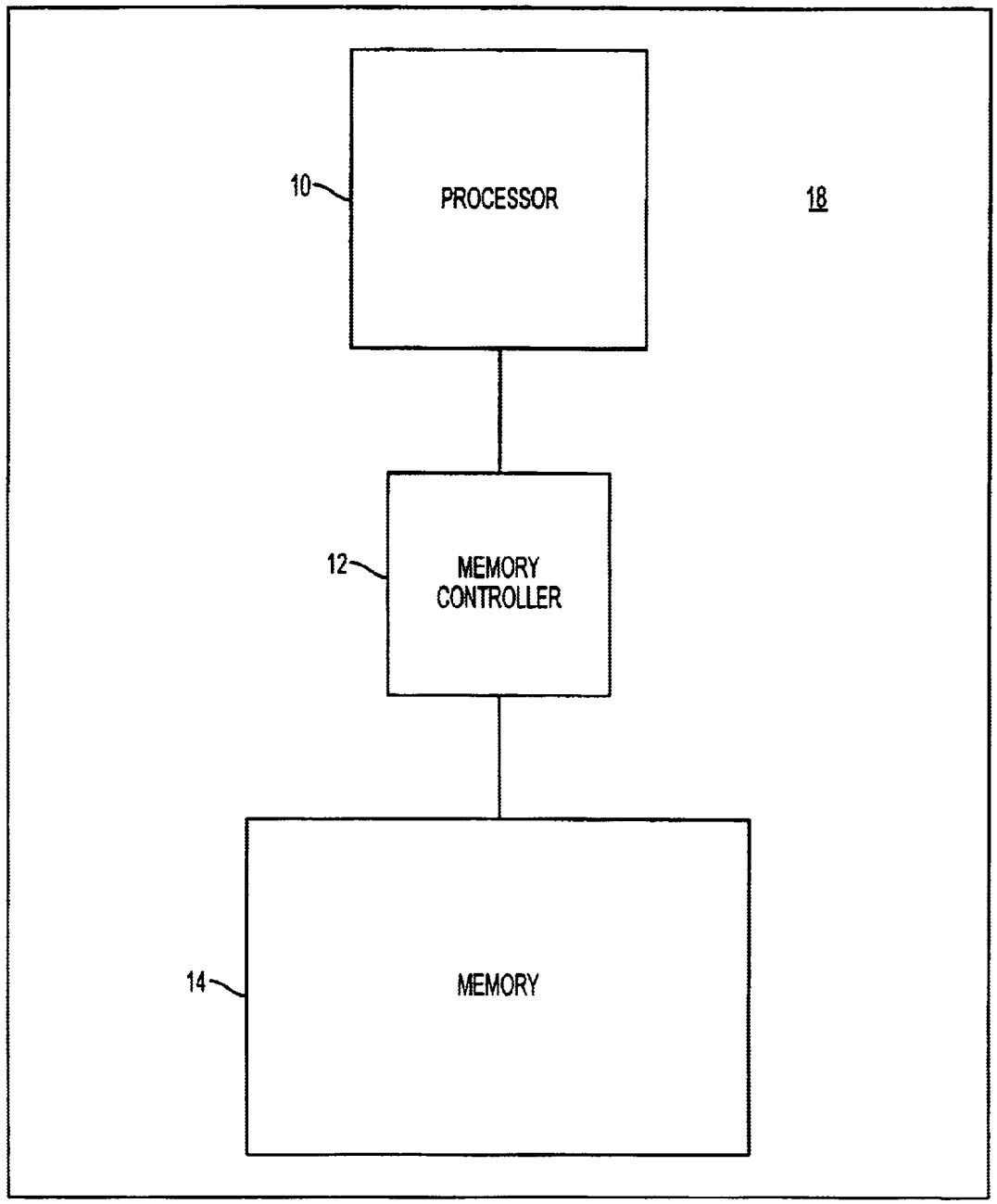
FIG. 1 is a block diagram of a computer system in accordance with one embodiment of the present invention.

FIG. 1 is a block diagram of a computer system 18 in accordance with one embodiment of the present invention. Computer system 18 includes a processor 10 which is coupled to a memory controller 12. Processor 10 can be any type of general purpose processor or any other type of processor that interfaces with memory. Memory controller 12 is coupled to memory 14. Memory 14 can be any type of memory. In one embodiment, memory 14 is comprised of banks (or "ranks") of dynamic random access memory ("DRAM"). Memory controller 12 controls the operation of memory 14 based on commands received from processor 10. Computer system 18 may include any additional components that can be found in a computer system.

In one embodiment, processor 10, memory controller 12 and memory 14 are located on a common circuit board, and at least memory controller 12 and memory 14 are located on a common power plane and on the same power plane as a power source. In another embodiment, memory controller 12 and memory 14 are located on different power planes, and different power planes as the power source.

As the memory devices consume power, target current 30 ("$I_{target}$") flows from source power plane 22 to target power plane 24. A sense resistor 32 ("$R_{sense}$") is placed between power plane 22 and target power plane 24. Sense resistor 32 has a relatively small resistance level. In one embodiment, sense resistor 32 has a value of approximately 0.01 ohms. A measurement of target current 30 and the voltage of target power plane 24 indicates how much power is consumed by target power plane 24.

An amplifier 26 coupled to sense resistor 32 interfaces, amplifies, and filters the voltage drop across sense resistor 32. In one embodiment, amplifier 26 includes two resistors "$R_1$", two resistors "$R_2$", two capacitors "$C_{filter}$" and a discrete amplifier 27. Output 29 of amplifier 26 outputs "$V'_{sense}$", which corresponds to the voltage drop across sense resistor 32. Amplifier 26 includes low pass filtering functionality so that a stable average power value is output. Amplifier 26 may be a voltage mode amplifier, a current mode amplifier, or any type of amplifier that can provide a representation of $I_{target}$ to memory controller 12.

In one embodiment, $V'_{sense}$ is calculated as follows:

$$V'_{sense} = R_2/R_1 (I_{target} R_{sense}).$$

In one embodiment, the power consumed by the memory devices located on target power plane 24 is calculated as follows:

$$\text{Power} = (V'_{sense} V_{DD} R_1)/(R_2 R_{sense}).$$

Output 29 is transmitted to memory controller 12, and converted to digital form by an Analog-to-Digital ("A/D") converter 44. The peak value is then detected and stored in Max Detect and Register module 46. A/D converter 44 and Max Detect and Register module 46 form a measurement module in one embodiment of the present invention.

Sense resistor 32 can be located anywhere so that it bridges source power plane 22 and target power plane 24. Amplifier 26 may be powered off any plane, but should not be located on target power plane 24 to avoid biasing the measurements with its own power consumption.

In operation, memory controller 12 initiates a series of memory operations, such as a burst of memory reads. These operations may be performed when computer system 18 is initially booted up, and may be part of the Basic Input/Output System ("BIOS") software code. The peak power consumption of the memory devices during the series of operations is detected and stored by Max Detect and Registers module 46. Memory controller 12 then uses the peak power measurements to set the throttling levels.

One embodiment of the present invention implements the throttling by using the peak power measurements to determine how much power cost a given operation (e.g., memory reads) costs and then tracks the percentage of time spent doing these operations when that percentage reaches a certain limit as programmed in the BIOS based on the power assumption or power measurements. Generally, this results in a weighted moving average with the weights being determined by the power costs per action that is being tracked. The embodiment of the present invention shown in FIG. 2 includes a power plane separate from the power plane housing memory 14. However, with many smaller computer systems, plane isolation is not desirable, and many components, including the memory controller and memory are on the same power plane. In addition, in the embodiment shown in FIG. 2 potentially large voltage drops across sense resistor 30 may be present in embodiments that have a high current consumption and/or larger values of sense resistor 30.

Figure 2:
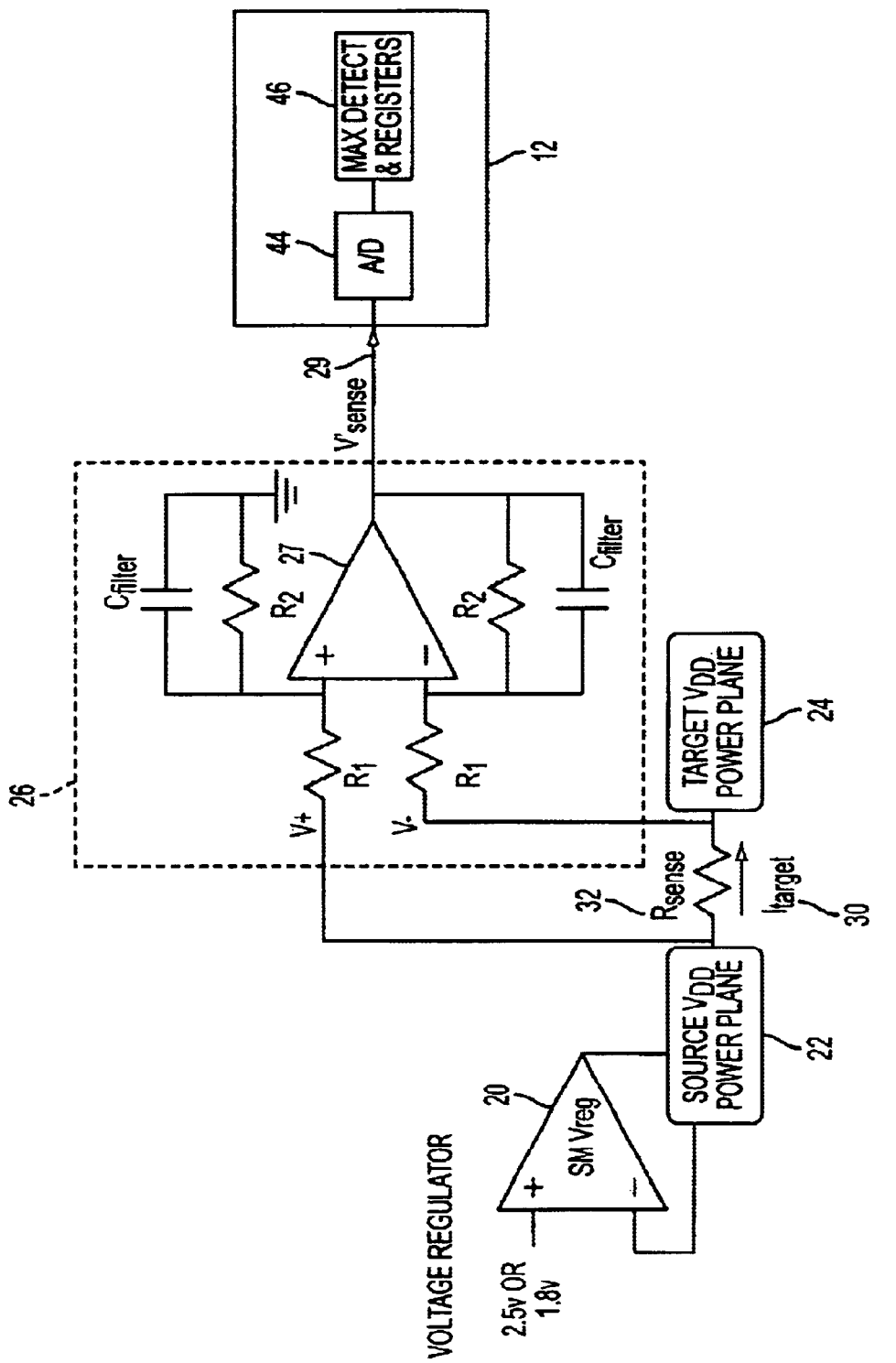
FIG. 2 is a circuit and block diagram of the memory controller and additional circuitry of the computer system in accordance with one embodiment of the present invention.
Figure 3:
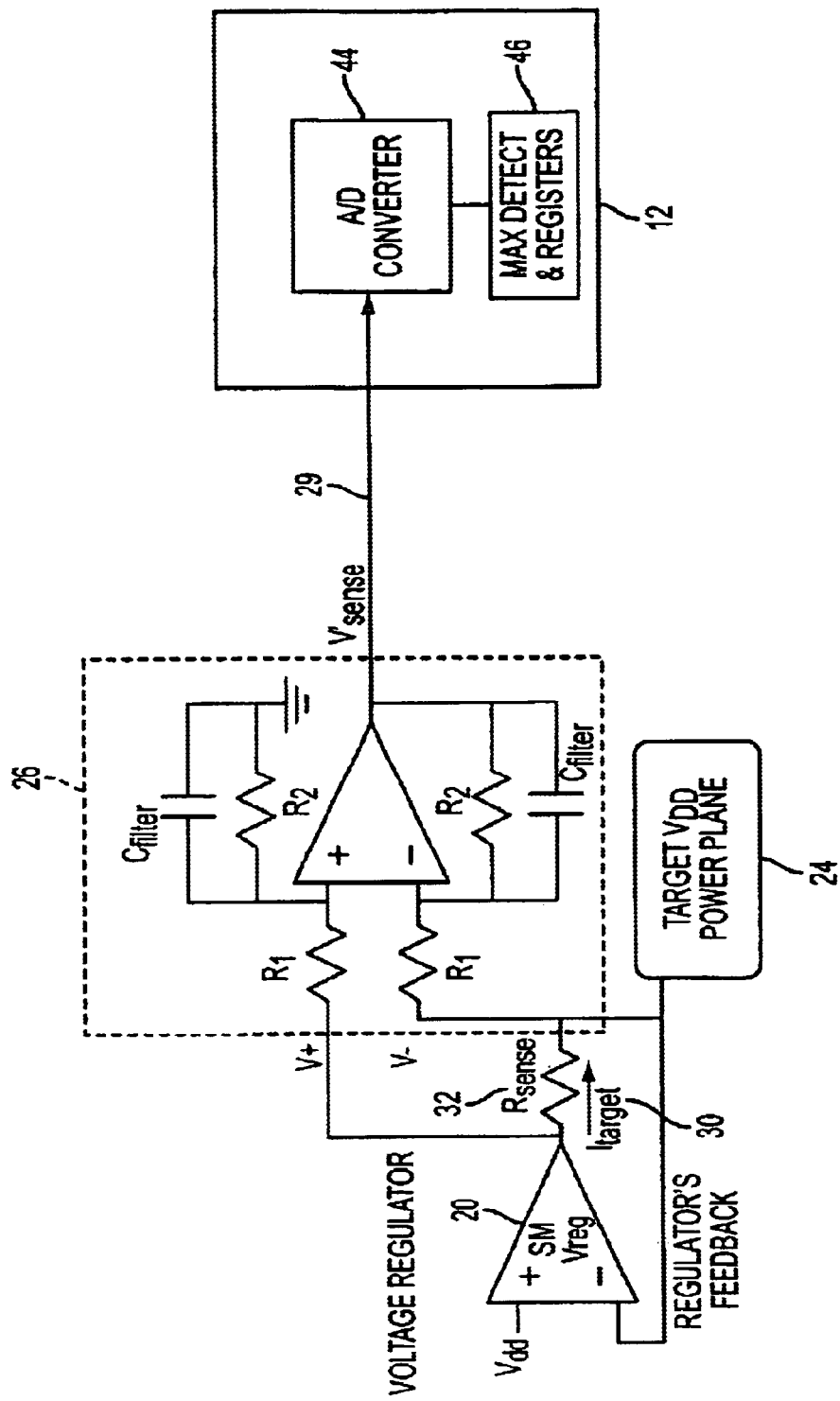
FIG. 3 is a circuit and block diagram of a memory controller and additional circuitry of a computer system in accordance with another embodiment of the present invention in which a memory controller and a memory are located on the same power plane.

FIG. 3 is a circuit and block diagram of memory controller 12 and additional circuitry of computer system 18 in accordance with another embodiment of the present invention in which memory controller 12 and memory 14 are located on the same power plane in order to avoid some drawbacks with the FIG. 2 embodiment. In FIG. 3, voltage regulator 20 is coupled directly to sense resistor 32, and voltage regulator 20, memory 14 and memory controller 12 are located on target power plane 24. A voltage drop across sense resistor 32 would affect the voltage applied to memory 14. Therefore, a voltage drop is avoided in FIG. 3 by placing sense resistor 32 in the feedback loop with voltage regulator 20. This allows voltage on the side of sense resistor 32 coupled to voltage regulator 20 to fluctuate, while being compensated by voltage regulator 20 to keep the voltage on the other side of sense resistor 32 constant. The feedback loop also eliminates large voltage drops across sense resistor 32.

In one embodiment of the computer system of FIG. 3, a sequence of memory operations are executed when determining peak power measurements of memory 14 in order to null out power consumption of memory controller 12. One embodiment of the sequence of operations are as follows:

1. Put all memory devices of memory 14 in self-refresh. In self-refresh mode, the memory devices have a very low power consumption and require no interface signals to be active except clock enable which is held de-asserted (low state) in one embodiment.
2. Disable all memory controller 12 output buffers except the clock enable signal.
3. Measure the power consumed and store as "Pmem-sr". Pmem-sr is the value of the offset of the system and the self-refresh power for the memory devices.
4. Re-enable the memory controller 12 I/O and drive all of the I/O signals as if a read to memory was taking place. Memory controller 12 should be aware of the fact the data strobes normally received during an I/O will not occur at this time since no memory is aware of the read operations taking place as they are all still in self-refresh. All data and strobe input buffers should remain disabled during this operation and all clock enable signals should remain low at this time to keep the devices in self-refresh. For extra accuracy on systems that use tristated chip select signals, one extra chip select, besides the one used in the dummy read operation, should be enabled and drive to an electrical high to mimic the current which would have been present with one clock enable signal high. This can be omitted if the inaccuracies are mathematically compensated for or considered in the error budget.
5. Measure the power consumed and subtract the value of Pmem-sr from this new measured value. Store this new calculated value as "Pmem-rd-io". Pmem-rd-io is the power consumed by memory controller 12 during read operations for the I/O portion, including command, address and control signals.
6. Drive all memory controller 12 I/O signals as if a write operation were taking place. The same data and address pattern as was used above in operation #4 for reads should also be used here. All data and strobe input buffers should remain disabled during this operation. All clock enable signals should remain low at this time to keep the devices in self-refresh. For extra accuracy on systems that use tristated chip select signals, one extra chip select, besides the one used in the dummy read operation, should be enabled and drive to an electrical high to mimic the current which would have been present with one clock enable signal high. This can be omitted if the inaccuracies are mathematically compensated for or considered in the error budget.
7. Measure the power consumed and subtract the value of Pmem-sr from this new measured value. Store this new calculated value as "Pmem-wr-io". Pmem-wr-io is the power consumed by memory controller 12 during write operations for the I/O portion including command, address and control, data, and data strobe signals. Pmem-wr-io can be used to determine the level of memory controller 12 write throttling needed based on a look-up table.
8. While still performing the write operations, enable the data and strobe input buffers on memory controller 12. Care should be taken in the memory controller 12 design to ensure that this causes no logical issues internal to the memory controller 12.
9. Measure the power consumed and subtract the value of Pmem-sr and Pmem-wr-io from this new measured value to get the power for just the data input path. Store this new calculated value as "Pmem-in-buffs". Pmem-in-buffs will be used as the power consumed by the memory controller 12 input buffers for this data sequence during read operations. The write data is used to stimulate the buffers so this measurement can be taken with the memory still in self-refresh.
10. Calculate the total power consumed by memory controller 12 during read operations as Pmem-rd-io+ Pmem-in-buffs. Store this value as "Pmem-rd-tot". Pmem-rd-tot is the total power consumed by memory controller 12 during read operations.
11. Wake up one populated rank of memory out of self-refresh "Rank" refers to an independent group of memory devices. For example in a 64-bit memory interface, each rank of memory would be a group of memory devices acting in parallel to provide a total of 64 data bits. There may be multiple ranks on a single interface which share a data and address bus and are used in a mutually exclusive fashion (i.e., only one rank of devices drives or receives data on the bus at a time).

12. Re-load the memory with the data pattern to be used during the read test.

13. Perform burst of read operations to this rank of memory.

14. Measure the power consumed and subtract the value of Pmem-sr and Pmem-rd-tot from this new measured value. Use this value to determine the level of read throttling needed by this rank of memory based on a look-up table. Not all of Pmem-sr should be subtracted from this value in reality since it also involved the power of the rank under test in self-refresh. Using this number will cause the measurement taken for the reads to be slightly lower than actual. This can either be accounted for by subtracting only the value of Pmem_sr scaled by (n−1)/n for n populated ranks which is a better pessimistic approximation. The effect of this will be small either way.

15. Put the rank of memory back into self-refresh.

16. Repeat operations 11 through 15 for all ranks of memory in the system.

Based on the peak power measurements obtained from the above operations, the throttling levels are set as in the embodiment of FIG. 2.

As described, embodiments of the present invention provides advantages over using prior art techniques such as using lab measurements or component specifications to determine what is the absolute worst-case power consumption for any memory device and the worst case memory controller interface power (for a given frequency or configuration) and using these numbers to set the throttling setpoint for the memory and the memory controller. These prior art techniques cause the system to potentially throttle unnecessarily when lower power memory is used.

Instead, embodiments of the present invention take actual measurements of memory power usage under various operation situations, and use these measurements to set the throttling setpoint. A sense resistor is used with additional circuitry to allow the memory system to self-calibrate every time the computer system is booted up. This has the dual benefit of increasing system performance when lower power memory is used and providing differentiation to reward memory makers that do better low power designs, since their memory would perform better in systems with this mechanism than higher power memory.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, although embodiments disclose memory that is being measured and throttled, any type of device that is thermally limited and needs to have its activity tracked for thermal limitation may be used.

What is claimed is:

1. A memory system comprising:
   a memory controller;
   a plurality of memory devices located on a first power plane and coupled to said memory controller;
   a sense resistor coupled to said first power plane;
   a power source coupled to said sense resistor; and
   a measurement module coupled to said memory controller that is adapted to measure a power consumption of the first power plane.

2. The memory system of claim 1, wherein said power source is placed on a second power plane.

3. The memory system of claim 1, wherein said power source is placed on said first power plane and in a feedback loop with said sense resistor.

4. The memory system of claim 1, wherein said plurality of memory devices comprise at least one bank of dynamic random access memory.

5. The memory system of claim 1, further comprising an amplifier circuit coupled to said sense resistor.

6. The memory system of claim 5, wherein said amplifier circuit is adapted to output a measurement of a current through said sense resistor.

7. The memory system of claim 6, wherein said measurement module comprises an analog-to-digital converter and is adapted to receive said measurement and determine a peak power consumption of said plurality of memory devices.

8. The memory system of claim 7, wherein said memory controller is further adapted to null out a second power consumption of said memory controller.

9. The memory system of claim 7, further comprising software instructions that are executed by said memory controller to determine said peak power consumption.

10. A computer system comprising:
    a memory controller;
    a first power plane
    a plurality of memory devices located on said first power plane and coupled to said memory controller;
    a sense resistor coupled to said first power plane;
    a power source coupled to said sense resistor; and
    a measurement module coupled to said memory controller that is adapted to measure a power consumption of the first power plane.

11. The computer system of claim 10, further comprising a second power plane, wherein said power source is placed on said second power plane.

12. The computer system of claim 10, wherein said power source is placed on said first power plane.

13. The computer system of claim 10, wherein said plurality of memory devices comprise at least one bank of dynamic random access memory.

14. The computer system of claim 10, further comprising an amplifier circuit coupled to said sense resistor.

15. The computer system of claim 14, wherein said amplifier circuit is adapted to output a measurement of a current through said sense resistor.

16. The computer system of claim 15, wherein said measurement module comprises an analog-to-digital converter and is adapted to receive said measurement and determine a peak power consumption of said plurality of memory devices.

17. The computer system of claim 16, wherein said memory controller is further adapted to null out a second power consumption of said memory controller.

18. The memory system of claim 16, further comprising a second memory storing software instructions that are executed by said memory controller to determine said peak power consumption.

19. A memory controller system comprising:
    a sense resistor adapted to be coupled to a plurality of devices; circuitry coupled to said sense resistor for outputting a measurement of current on said sense resistor; and
    a module coupled to said circuitry for determining a peak of said current measurement.

20. The memory controller system of claim 19, wherein the plurality of devices are memory devices.

21. The memory controller system of claim 20, wherein said module is located on a first power plane, and the memory devices are located on a second power plane.

22. The memory controller system of claim 20, wherein said module and the memory devices are located on a first power plane.

23. The memory controller system of claim 22, wherein said module is further adapted to null out a second power consumption of said module.

24. The memory controller system of claim 19, wherein said circuitry comprises an amplifier.

25. The memory controller system of claim 21, wherein said sense resistor is in a feedback loop with a power source.

26. The memory system of claim 6, wherein said amplifier comprises a low pass filter.

27. The memory controller system of claim 19, wherein said module is adapted to determine a peak power consumption of the plurality of memory devices.

* * * * *

UNITED STATES PATENT AND TRADEMARK OFFICE
CERTIFICATE OF CORRECTION

PATENT NO.        : 6,944,084 B2
APPLICATION NO. : 10/331333
DATED             : September 13, 2005
INVENTOR(S)       : Jeffrey R. Wilcox It is certified that error appears in the above-identified patent and that said Letters Patent is hereby corrected as shown below:

Column 6, Line 58 "a second memory storing software instructions"
should be --second memory storing software instructions--

Signed and Sealed this

Twenty-first Day of November, 2006

JON W. DUDAS
*Director of the United States Patent and Trademark Office*